United States Patent
Boer et al.

(10) Patent No.: US 7,100,387 B2
(45) Date of Patent: Sep. 5, 2006

(54) METHOD FOR CONTROLLING A MULTIPLE COOLING COMPARTMENT REFRIGERATOR, AND REFRIGERATOR USING SUCH METHOD

(75) Inventors: Alessandro Boer, Cassinetta di Biandronno (IT); Raffaele Paganini, Varese (IT); Rocco Petrigliano, Valsinni (IT)

(73) Assignee: Whirlpool Corporation, Benton Harbor, MI (US)

( * ) Notice: Subject to any disclaimer, the term of this patent is extended or adjusted under 35 U.S.C. 154(b) by 301 days.

(21) Appl. No.: 10/661,206

(22) Filed: Sep. 12, 2003

(65) Prior Publication Data

US 2004/0103674 A1 Jun. 3, 2004

(30) Foreign Application Priority Data

Sep. 13, 2002 (EP) ................................. 02020506

(51) Int. Cl.
*F25D 17/06* (2006.01)

(52) U.S. Cl. ................... 62/228.5; 62/180; 62/229; 62/186; 62/199

(58) Field of Classification Search .............. 62/228.3, 62/228.4, 228.5, 229, 198, 227, 199, 208, 62/224, 225, 186, 200, 187, 179, 180
See application file for complete search history.

(56) References Cited

U.S. PATENT DOCUMENTS

| | | | | |
|---|---|---|---|---|
| 4,633,675 A | * | 1/1987 | Sato | 62/229 |
| 4,959,974 A | * | 10/1990 | Kusakabe | 62/228.5 |
| 5,465,591 A | * | 11/1995 | Cur et al. | 62/199 |
| 5,715,693 A | * | 2/1998 | van der Walt et al. | 62/228.4 |
| 5,867,998 A | * | 2/1999 | Guertin | 62/225 |

* cited by examiner

*Primary Examiner*—Harry B. Tanner
(74) *Attorney, Agent, or Firm*—Robert O. Rice; John F. Colligan; Stephen Krefman (57) ABSTRACT

A method for controlling a refrigerator having a variable speed compressor and at least two compartments (FR, FZ) cooled to respective temperatures and comprising sensor devices ($T_R$, $T_Z$) for generating control signal responsive to cooling demands of the respective compartments comprises the step of providing the control system with a signal indicative of the total cooling demand on the basis of the sum of each compartment cooling demand, such signal being used to drive the variable speed compressor according to said total cooling demand.

12 Claims, 8 Drawing Sheets

METHOD FOR CONTROLLING A MULTIPLE COOLING COMPARTMENT REFRIGERATOR, AND REFRIGERATOR USING SUCH METHOD

BACKGROUND OF THE INVENTION

1. Field of the Invention

The present invention relates to a method of controlling a multiple cooling compartment refrigerator, preferably of the type having a variable capacity compressor or a refrigerant flow rate control valve.

2. Description of the Related Art

A kind of refrigerator having a great success in the domestic appliance market is the one having a fridge and a freezer unit in a cabinet with a single compressor. This success is due on one side to versatility of such solution (two compartments at different temperatures, two doors) and on the other side to the lower price of such refrigerator that has a single compressor and a single refrigeration circuit, if compared to a dual compressor refrigerator.

The drawback of this technical solution is a not easy independent control of temperatures in the fridge compartment and in the freezer compartment.

Figure 1:
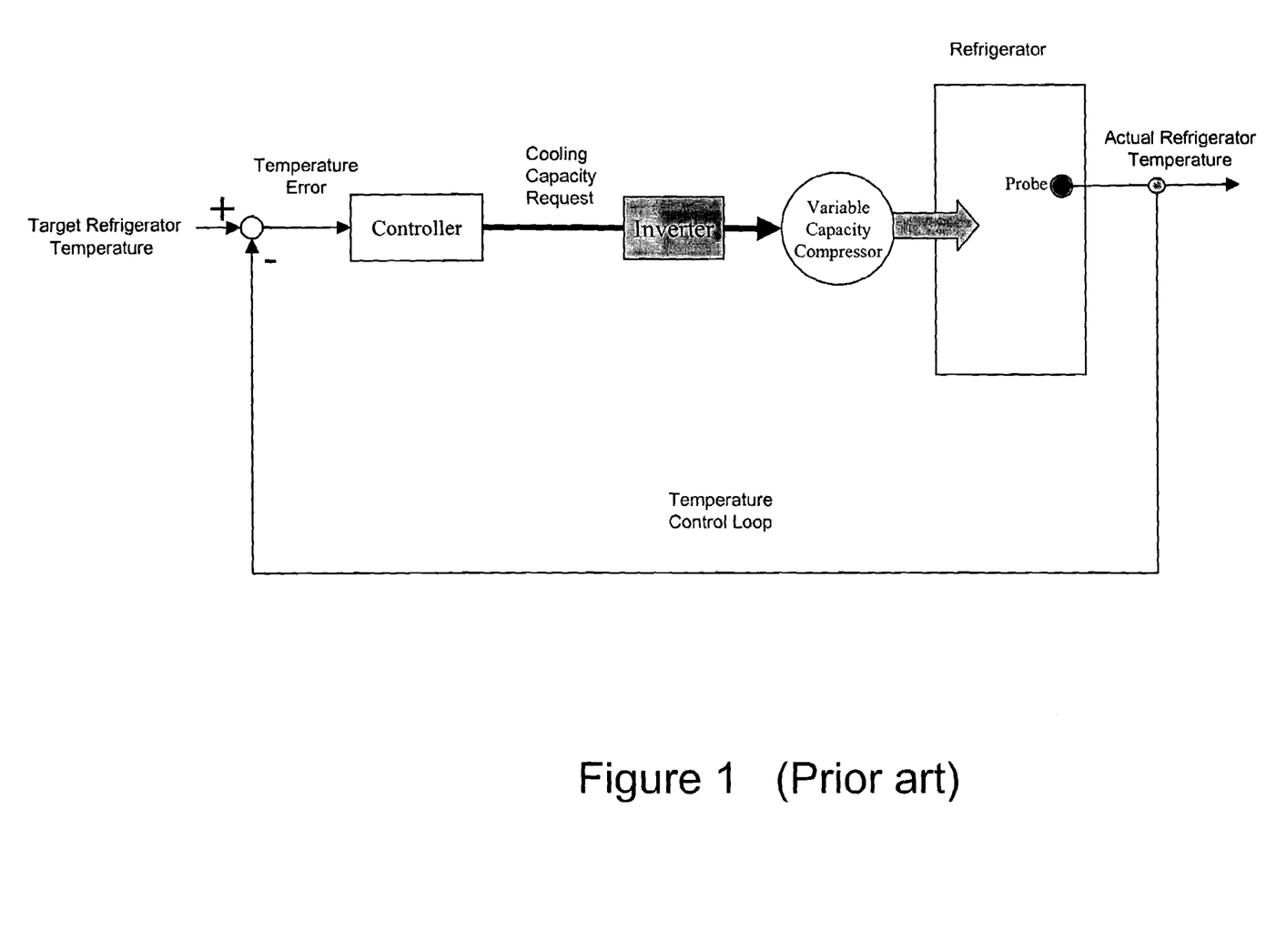
FIG. 1 represents a classical temperature control block diagram showing the approach used to determine the suitable cooling capacity in case of variable cooling capacity compressor and in case of a single compartment.

The temperature control of a freezer compartment (FZ) or a refrigerator compartment (FR) is generally obtained, in case of an appliance having electronic control circuit and in case of use of a variable cooling capacity compressor, by adjusting the compressor cooling capacity on the basis of the temperature error parameter. Another way of controlling temperatures of refrigerator compartments is to adjust the flow rate of the refrigerant delivered to the evaporator by means of a flow rate control valve, or to adjust the cooling-air flow delivered to compartments through a movable damper. The classical control logic is PID based, meaning that the Proportional, Integrative and Derivative parts of the temperature error variable are taken in consideration in the negative feedback system to adjust the output variable up to obtain the needed temperature. The attached FIG. 1 shows a case in which the PID negative feedback control system is used to control the temperature of a single compartment refrigerator. The input of the PID control block is the Temperature Error (difference between the target temperature and the actual one) and the output is directly converted in cooling capacity request. The sensed temperature can be either the temperature inside the compartment or the temperature of one or more predetermined zones of the evaporator. A dedicated inverter will receive the cooling capacity request signal as input and will have the task to drive the compressor keeping under control the cooling capacity (such compressor being either of the type having a variable speed or of the type with a variable displacement, i.e. the so-called linear compressor).

In case of multiple compartments and a single compressor available, the control of the temperatures becomes more critical. One of the known solution for a dual compartment refrigerator, disclosed in EP-A-859208, comprises two temperature sensors, one in the refrigeration chamber forming part of the control circuit made to stop and start the compressor, the other in the freezing chamber forming part of the control circuit made to control the speed of the compressor.

Figure 2:
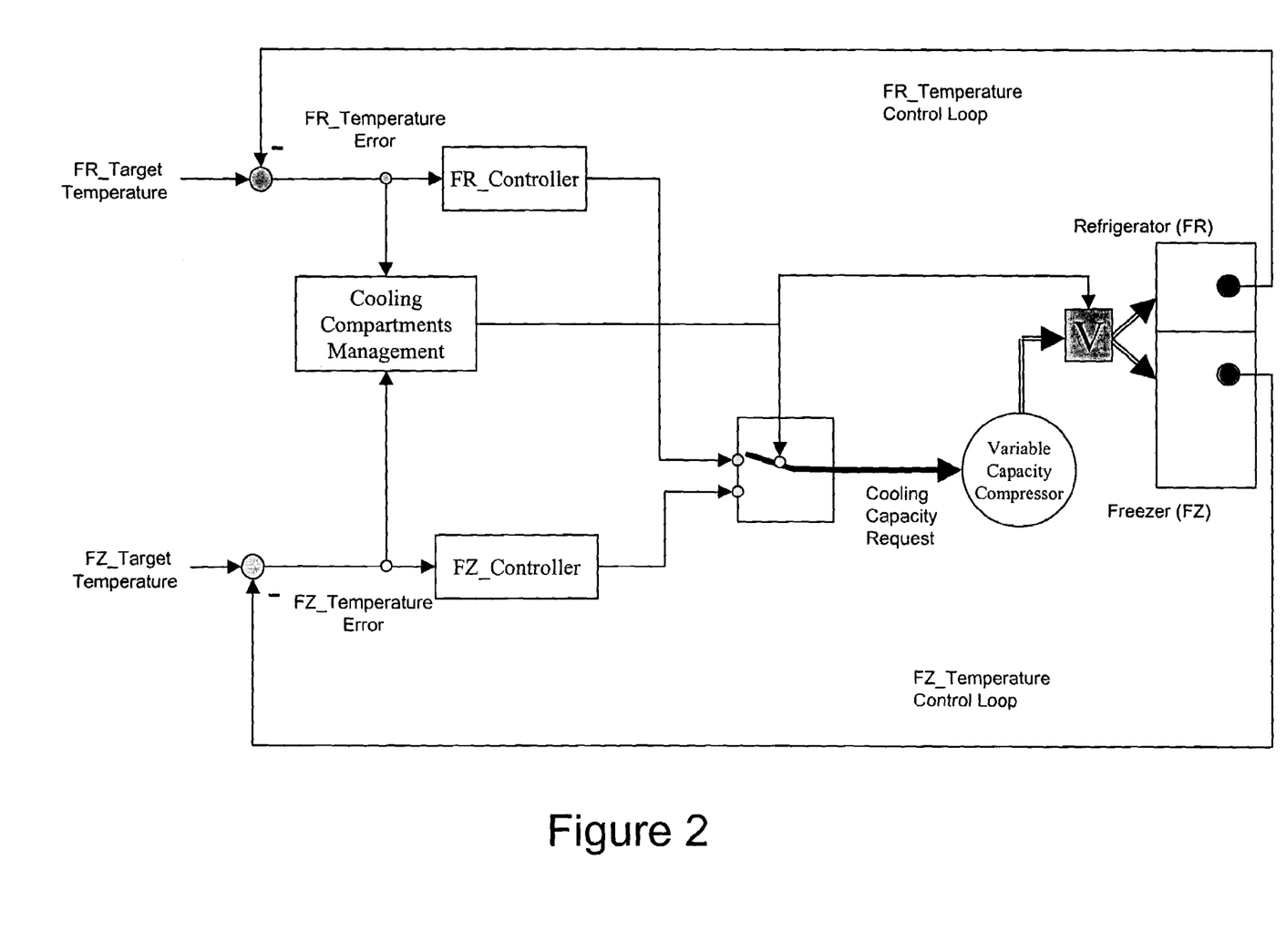
FIG. 2 is a block diagram showing a control strategy adopted to control the temperature in a dual compartments appliance and in which the compressor receives two independent data coming from two independent control blocks.

FIG. 2 shows the condition according to another solution in which the control operates in a case of a dual compartment refrigerator. The two blocks "FR_Controller" and "FZ_Controller" can be two PID-like controllers and each of them computes the "Cooling Capacity Request" to be provided to the compressor, necessary for controlling the temperature of the respective compartment refrigerator (FR) or freezer (FZ). The "Cooling Compartment Management" is a control block used to establish the direction and/or the flow rate of the refrigerant, or in case of a refrigerator cooled by cooling air (typical the case of so-called side-by-side refrigerator), the position of a damper which splits the air flow between the freezer and the fresh food compartments. In the above first case, the "V" device is a valve receiving the command and delivering totally or partially the refrigerant across the refrigerator evaporator and/or the freezer evaporator. Ideally, the controller has multiple control tasks: firstly the controller has to keep the temperatures set by the user and, secondly, the controller has to be able to efficiently drive the compressor and the valve V to keep the energy consumption as low as possible. However, in case of independent controls (as shown in FIG. 2) the solution may be very complicated or even impossible if the energy consumption has to be kept low.

SUMMARY OF THE INVENTION

One object of the present invention is to provide a method and a refrigerator using such method which, in case of multiple compartment temperature control, can satisfy the temperature requirements and at the same time can run the appliance at maximum system efficiency, achieving very low energy consumption.

According to the present invention, this may be obtained with a method and with a refrigerator having the features listed in the appended claims.

The present invention is mainly based on the use of a cooling capacity request control that depends on the "state" of all the compartments to be controlled.

The "state" represents how much the compartments have to be cooled and the cooling request control block receives the sum of all the states of the compartments, based on the sum of error-related signals of each negative feedback control system associated with each compartment. The main purpose of the present invention is to obtain a single information of the appliance "state" and so drive the control actuator, for instance the compressor, as it were a single compartment. The "state" of each compartment is obtained by processing the temperature error data related to each single feedback control system. An example of the transfer function of the $N^{th}$ compartment error-processing block can be as follows:

$$state_N = G_N\left(1 + \frac{1}{s*T_i} + sT_d\right)$$

where $G_N$, $T_i$ and $T_d$ are three constants (gain, integrative time and derivative time) that depend on the dynamics of the $N^{th}$ compartment. The task of this block is to filter the temperature error information and mainly to provide historical values of the error itself (integrative part). Even if in the following description reference is made to a general PID control system (where it is intended that not all the three actions, proportional-integral-derivative are always necessary for a good control), other control systems may be used as well, for instance a control system based on a set of fuzzy logic rules.

In case of dual compartment temperature control a valve may be used to deliver totally or partially the refrigerant in the appliance evaporators. According to the invention the management of the valve position that switches from two different positions may be based on the difference between the "state" of each compartment.

The above valve may be used to cool contemporaneously two compartments or only one. The cooling compartment management control block (responsible for determining the position of such valve) may also be based on the "state" of one compartment only.

The method according to the invention can be applied in appliances equipped with only one evaporator and in cases in which the valve is replaced by damper that is dedicated to cool one or more compartments.

In case the control actuator is a valve allowing a refrigerant flow rate control (in addition to one or more flow direction), the determination of the flow rate, in each direction, can be determined with the same control logic established to drive the compressor drive system, i.e. on the basis of the sum of each compartment state. It is evident, in fact, that the cooling capacity variation is obtained by varying the refrigerant flow rate.

According to a further embodiment of the invention, in case the valve is allowing a refrigerant flow rate control (one or more direction), the adjustment of the flow rate, in each direction, can be carried out on the basis of the difference between the input and output temperature in the evaporator, and with a PID-like controller block.

BRIEF DESCRIPTION OF THE DRAWINGS

The invention will now be explained in more detail with reference to the accompanying drawing, in which.

DETAILED DESCRIPTION

Figure 3:
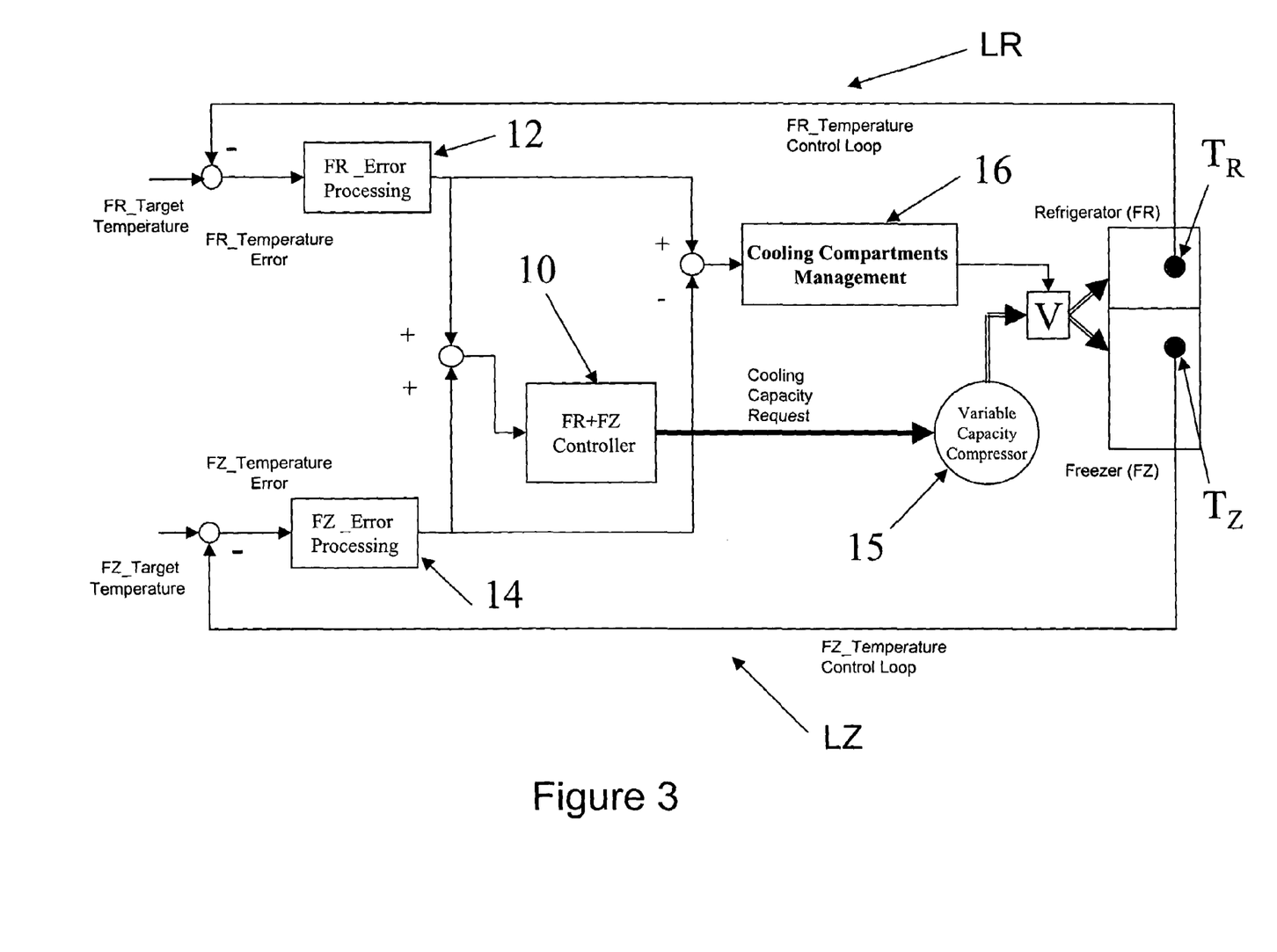
FIG. 3 is a block diagram showing how to control a refrigerator according to a first embodiment of the invention, the control providing the compressor with a cooling request that is computed by summing the state of the two compartments, and in which the valve position is obtained by subtracting the state of the two compartments.

With reference to the drawings, and particularly with reference to FIG. 3, the cooling request control block 10 is a regulator type that varies the cooling capacity according to the sum of the compartment states. Each compartment is provided with a temperature sensor $T_R$ and $T_Z$ respectively linked to a negative feedback control loop LR and LZ respectively. PID regulator type units 12 and 14 receive output from the temperature sensors $T_R$ and $T_Z$ respectively, generate compartment state value and can be used for control purpose wherein the output data is scaled and adapted to the type of compressor which is used. The compartment state value represents how much the compartments have to be cooled. The state of each compartment is obtained by processing the temperature error data related to each compartment. The outputs of units 12 and 134, the compartment states, are summed and provided to the control block 10. Based on this summed value, a total cooling demand is generated. The total cooling demand value is used to drive a compressor 15, which is shown in FIG. 3 as a variable capacity compressor.

In addition to generating a total cooling demand value, control block 16, called "cooling compartment management" in the following, operates to determine which compartment is to be cooled. According to this decision the position of a valve V (or damper) will be set. The determination of the valve position is based on a temperature error information followed by an hysteresys function. The temperature errors information used for controlling of the position of the valve V is represented by the difference of the compartment "states", which are determined by the same error processing blocks 12 and 14 considered previously with reference to the control of the compressor (see FIG. 3). In this manner, the compartment with the greatest cooling demand is cooled first.

Figure 4:
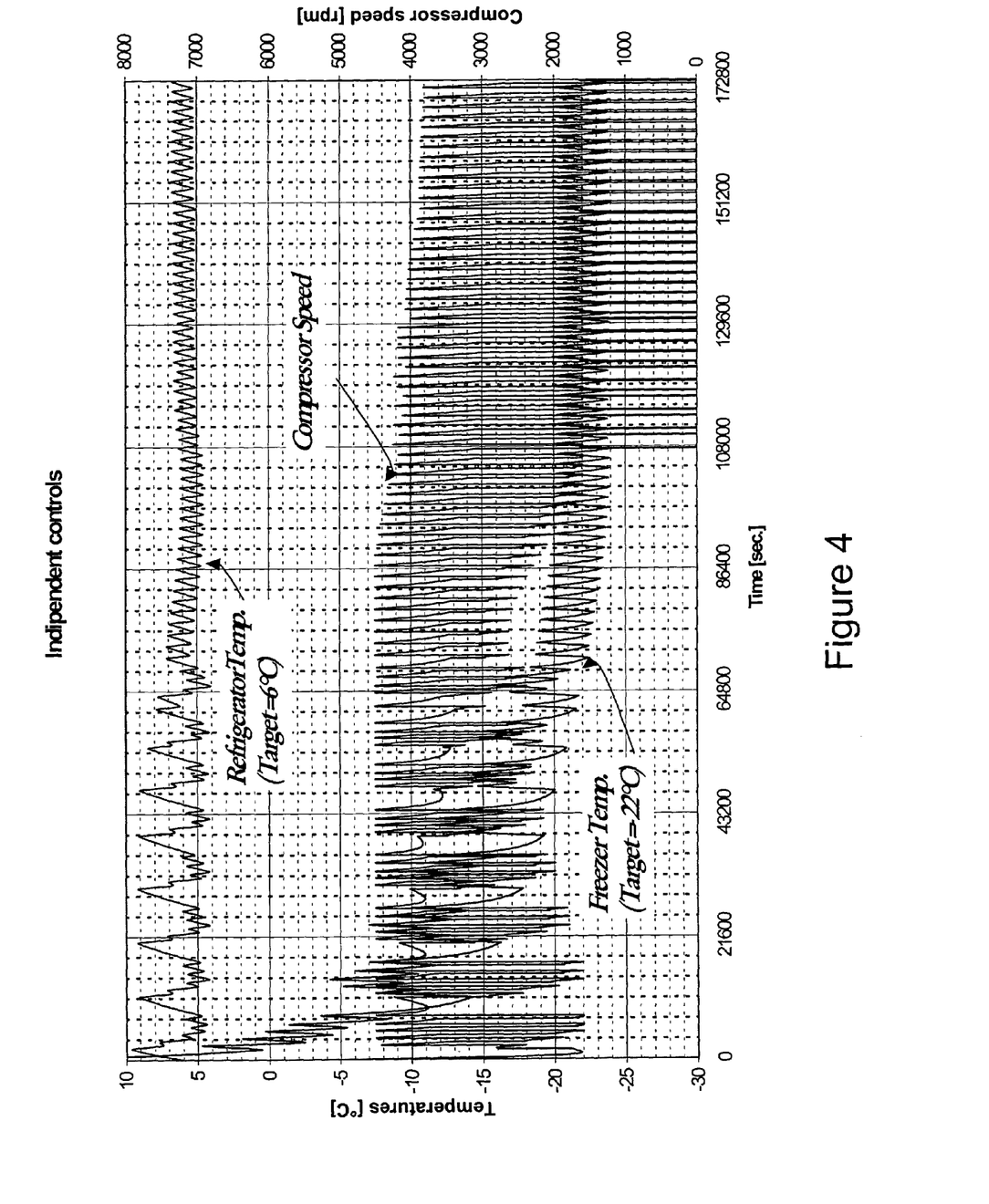
FIG. 4 is a diagram which plots the temperatures and the compressor speed of a variable Speed Compressor when a prior art control according to FIG. 2 is applied.
Figure 5:
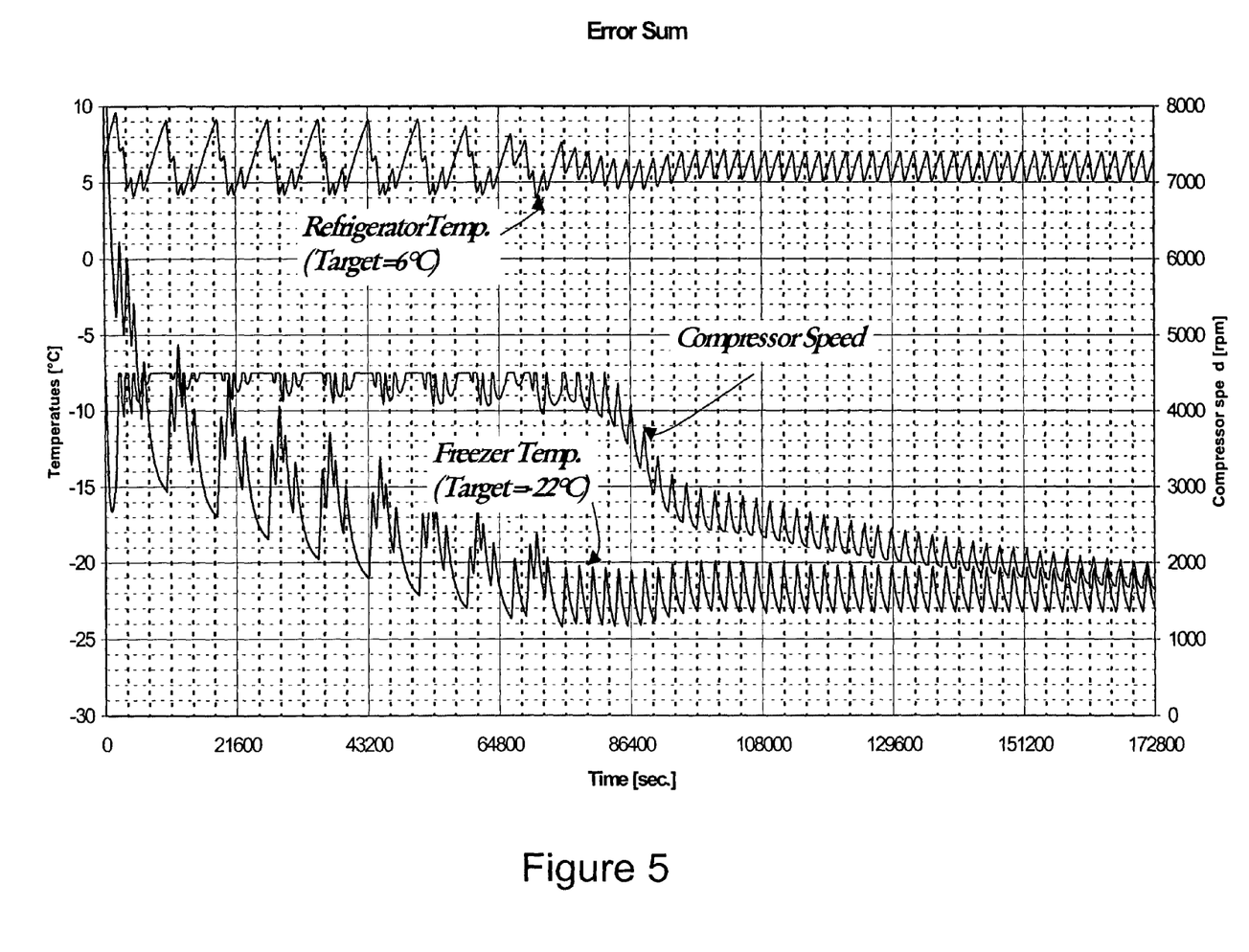
FIG. 5 is a diagram which plots the temperatures and the compressor speed when a control according to the invention is used.

With reference to FIGS. 4 and 5, the applicant made tests with a variable speed compressor ("VSC") and with a control system according to prior art, as shown in FIG. 2, and according to the present invention, as shown in FIG. 3, respectively. In such figures the cooling capacity request is represented by the "Compressor Speed" reference signal. For this compressor type there are practical speed limits: 1600 rpm and 4500 rpm respectively for the lowest and the highest speed. When the control requires speed (cooling capacity) lower than the minimum one the compressor is switched off.

By comparing FIG. 4 and FIG. 5, in which a freezer pull-down phase is shown, it is clear what are the main advantages of the control method according to the invention, i.e. the cooling request oscillation and the emitted noise are strongly reduced and the system reaches its temperature target very rapidly, with an improved energy saving. The temperature targets of the fridge and freezer compartment in the tests shown in FIGS. 4 and 5 are +6° C. and −22° C. respectively and the initial temperatures are 5° C. for the fridge and 25° C. for the freezer compartment.

In case of two independent control strategy (FIG. 2) the two regulators set respectively a low speed for the refrigerator compartment, because the FR error is relatively low, and a very high speed for the freezer compartment due to the high FZ error (FIG. 4). When the valve V switches the refrigerant fluid from one direction to the other, the corresponding reference speed is provided to the compressor introducing big cooling request oscillations to the thermodynamic circuit. The negative effects are noise generation and energy losses.

In FIG. 5, the effect of the solution according to the invention, obtained by applying a control method as described in FIG. 3, is visible by comparison. The cooling request is initially very high (tends to the maximum 4500 rpm) because the sum of errors, that mainly depends from the Fz error, is very high. The same cooling request provided for cooling the freezer compartment is also set for the fridge compartment; the effect is that the valve V remains on the $F_R$ position for a lower time while more time is dedicated to cooling the freezer compartment. A clear effect is that the freezer compartment takes less time to reach its target and also the reference speed provided to the compressor is quite stable and so the noise is limited. Once the system reaches the steady state condition the cooling request becomes, in average, very low and little energy is spent to compensate the appliance thermal dispersion. In the example shown in FIG. 5 the compressor speed tends to be lower than 2000 rpm and the speed variation is minimal due to the small temperature oscillations and their corresponding small temperature error, i.e. small sum of errors. For that reason the major consequence is that the total amount of energy spent, compared to a classical control system adopting independent controllers, is strongly reduced. Up to a surprising 10% of energy saving has been observed during energy tests carried out by the applicant.

Figure 6:
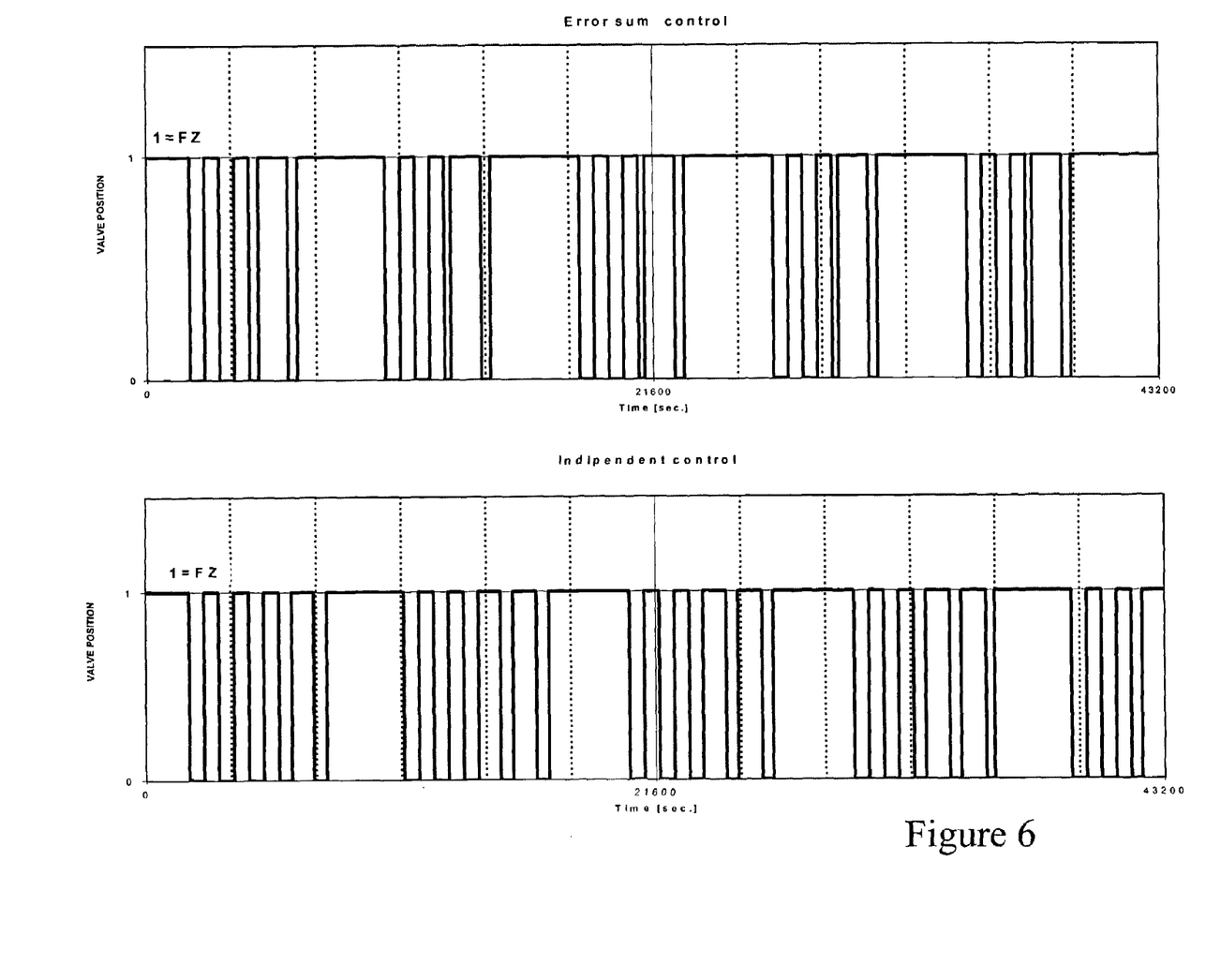
FIG. 6 is a diagram which shows the signal provided to the valve and establishing its position according to the present invention (FIG. 3) and to the independent control strategy (FIG. 2) according to prior art.

Another comparison between an independent control blocks system and the present invention is derivable from the analysis of FIG. 6. Such comparison results are obtained by controlling a refrigerator having a valve that delivers the refrigerant in only one of the two evaporators (so called "sequential" refrigerator as disclosed in U.S. Pat. No. 5,465, 591): when one ambient is cooled the other becomes warmer up to provoke the valve switching. There are also appliances in which the valve (non-sequential) can deliver the refrigerant in only one evaporator (generally the freezer) or, when the valve is switched, in both the evaporators contemporaneously. From FIG. 6 it is clear that the method according to the invention (upper portion of FIG. 6) requires a lower number of switching of the valve, if compared to a method with independent control (FIG. 2). This means a reduced noise and lower energy consumption.

Figure 7:
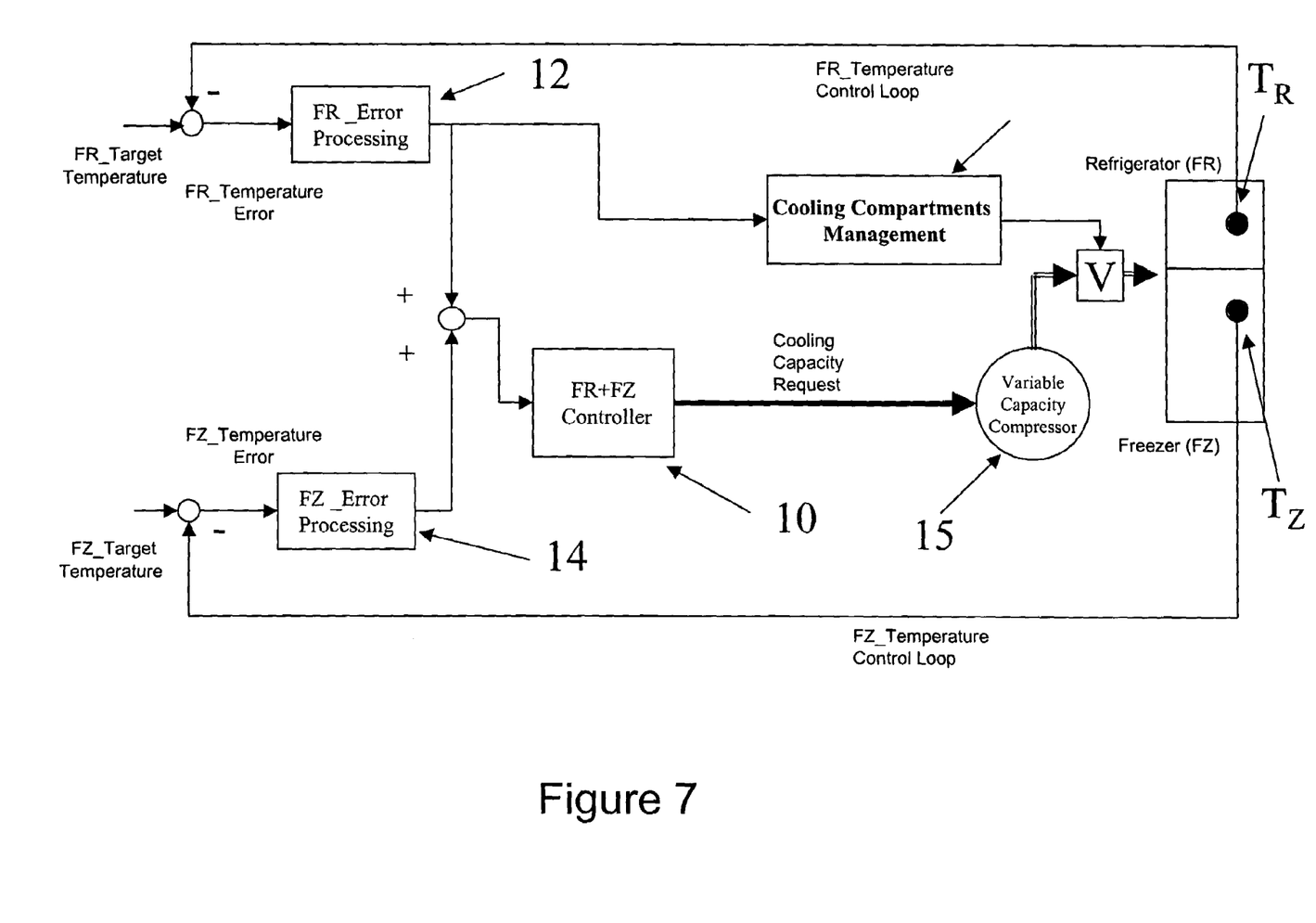
FIG. 7 shows the case of control application according to the invention in which the cooling compartment management controls a non-sequential valve.

FIG. 7 shows the case of the control applied to a dual compartment appliance in which the valve position selects the FR+FZ cooling or the FZ cooling only (non-sequential valve). In this condition the "state" of the FR compartment only is used by the cooling compartment management control block.

Figure 8:
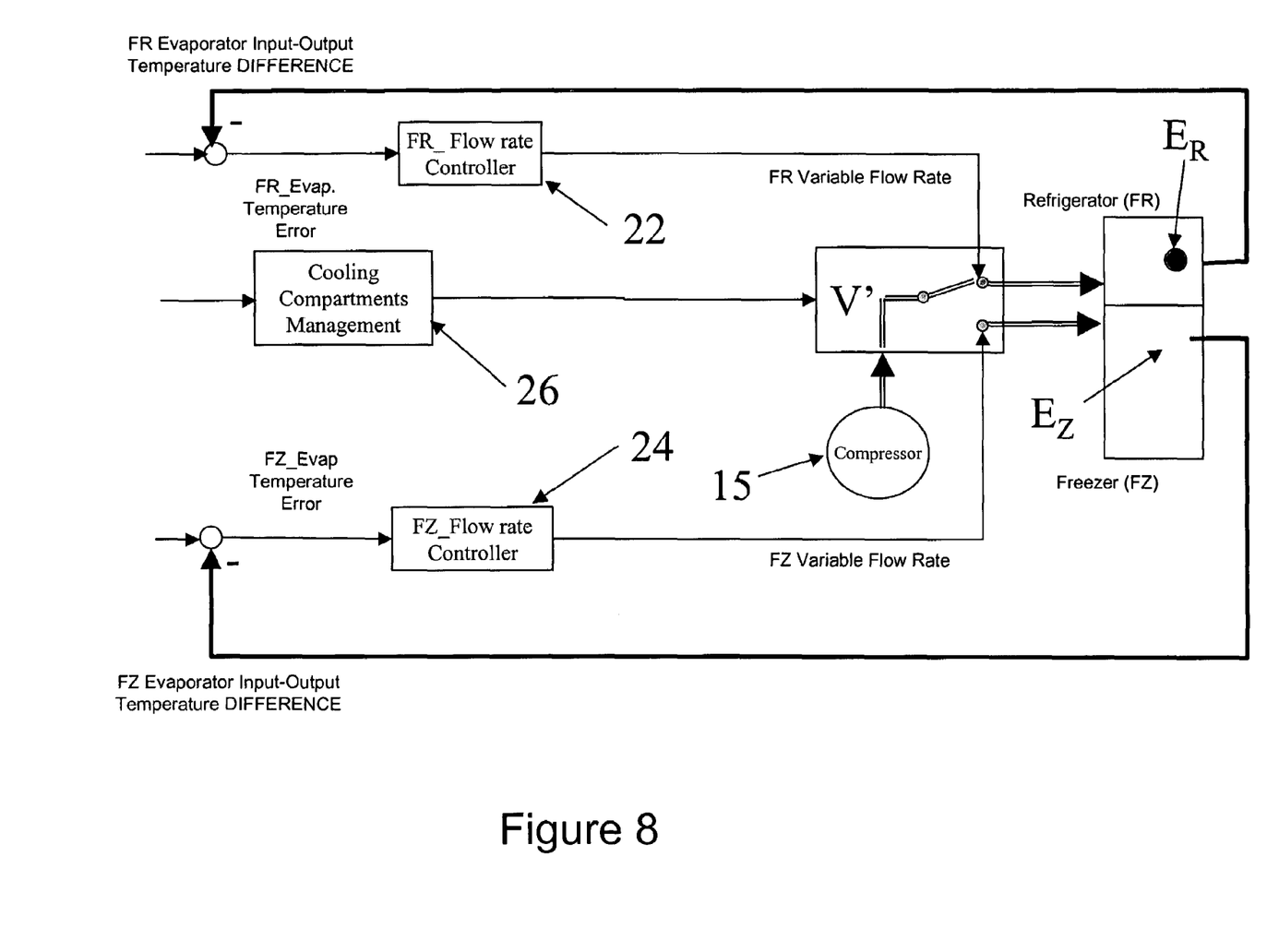
FIG. 8 shows a second embodiment of the invention for controlling the flow rate of the refrigerant when a valve, with variable flow rate, is used to vary the cooling capacity on one or two branches of the thermodynamic circuits.

FIG. 8 shows a second embodiment of the invention for controlling the flow rate of the refrigerant when a valve, with variable flow rate, is used to varies the cooling capacity on one or two branches of the thermodynamic circuits. Each feedback control loop receives input from temperature sensors $E_R$ and $E_Z$ placed on each evaporator. Each of the above sensors is preferably an array of two sensors able to assess the temperature difference between the evaporator input and output. Such temperature difference is indicative of the cooling capacity request of each compartment. Each of such signals is used by a controller block 22 and 24 respectively for adjusting the flow rate of the refrigerant, by means of a control valve V'. In FIG. 8 the control block 26 shows that each signal from controller block 22 and 24 is used only when the valve V' is positioned to direct refrigerant flow to the corresponding evaporator. In this manner the signal from the controller block 22 is used when refrigerant flows through the refrigerator evaporator and the signal from the controller block 24 is used when refrigerant flows through the freezer evaporator. Therefore the cooling compartment management control block 26 works substantially in the same manner as disclosed with reference to the first embodiment (FIG. 3). It is clear that the single valve V or V' can be replaced by more valves performing the same overall functions.

We claim:

1. A method for controlling a refrigerator having a control actuator and at least two compartments cooled to respective temperatures and comprising sensor devices for generating control signals responsive to cooling demands of the respective compartments, the method comprising the steps of:

generating a signal indicative of the total cooling demand on the basis of the sum of each compartment cooling demand;

using the signal to drive the control actuator according to the total cooling demand;

directing a refrigerant or a cooling-air flow to one of the at least two compartments; and generating an auxiliary signal indicative of the direction of refrigerant or cooling-air flow on the basis of the difference between signals responsive to cooling demands of the at least two compartments.

2. The method according to claim 1, wherein the control actuator is a variable speed compressor.

3. The method according to claim 1, wherein the control actuator is a refrigerant flow rate control valve.

4. The method according to claim 1, in which the control signals are temperature signals indicative of a temperature error between an actual temperature and a target temperature in each of the at least two compartments, wherein such temperature signals depend on present, past and estimated future temperature errors.

5. The method according to claim 1, wherein the control actuator is a valve for controlling the flow rate of the refrigerant, the above signals being indicative of a temperature difference across each evaporator.

6. The method according to claim 5, wherein said valve is adapted to deliver the refrigerant in one of the evaporators corresponding to the compartments, and comprising the further step of adjusting the flow rate for the evaporator supplied with refrigerant.

7. A refrigerator comprising:

at least two compartments cooled to respective temperatures; and a refrigerator control system comprising:

sensor devices for generating refrigerator control signals responsive to cooling demands of each of the at least two compartments, and a valve for directing a refrigerant or a cooling-air flow to one of the at least two compartments;

wherein the refrigerator control system is adapted to issue a signal indicative of the total cooling demand on the basis of the sum of each compartment cooling demand, such signal being used to drive the valve according to such total demand, and the direction of refrigerant or cooling-air flow in one of the at least two compartments on the basis of the difference between compartment cooling demands.

8. The refrigerator according to claim 7, wherein the control actuator is one of a variable speed compressor, a linear compressor, or a compressor in which the cooling capacity thereof can be controlled.

9. The refrigerator according to claim 7, wherein the control actuator is a refrigerant flow rate control valve.

10. The refrigerator according to claim 7, wherein the refrigerator control signals responsive to cooling demands of the respective compartments contain temperature error.

11. The refrigerator according to claim 7, wherein the control actuator is a valve for controlling the flow rate of the refrigerant, the above signals being indicative of a temperature difference across each evaporator.

12. The refrigerator according to claim 11, wherein said valve is adapted to deliver the refrigerant in one of the evaporators corresponding to the compartments, the flow rate being adjustable for the evaporator supplied with refrigerant.

* * * * *